(12) United States Patent
Buford et al.

(10) Patent No.: US 9,049,290 B2
(45) Date of Patent: Jun. 2, 2015

(54) INTERACTION DETECTION BETWEEN WEB-ENABLED AND CALL-RELATED FEATURES

(75) Inventors: John Buford, Princeton, NJ (US); Mario Kolberg, Glasgow (GB); Venkatesh Krishnaswamy, Holmdel, NJ (US); Krishna Kishore Dhara, Dayton, NJ (US); Xiaotao Wu, Metuchen, NJ (US)

(73) Assignee: Avaya Inc., Basking Ridge, NJ (US)

( * ) Notice: Subject to any disclaimer, the term of this patent is extended or adjusted under 35 U.S.C. 154(b) by 676 days.

(21) Appl. No.: 12/826,297

(22) Filed: Jun. 29, 2010

(65) Prior Publication Data

US 2010/0329140 A1 Dec. 30, 2010

Related U.S. Application Data

(60) Provisional application No. 61/221,211, filed on Jun. 29, 2009.

(51) Int. Cl.
| | | |
|---|---|---|
| *H04L 12/28* | (2006.01) | |
| *H04L 12/403* | (2006.01) | |
| *G06F 15/16* | (2006.01) | |
| *G06F 15/173* | (2006.01) | |
| *G06F 17/00* | (2006.01) | |
| *G06N 7/00* | (2006.01) | |
| *H04M 3/42* | (2006.01) | |
| *H04M 7/12* | (2006.01) | |

(Continued)

(52) U.S. Cl.
CPC .......... *H04M 3/4217* (2013.01); *H04M 7/1205* (2013.01); *H04Q 3/0041* (2013.01); *H04L 67/02* (2013.01)

(58) Field of Classification Search
USPC .......... 370/252, 410, 449; 709/224, 203, 227; 455/459; 706/47, 56
See application file for complete search history.

(56) References Cited

U.S. PATENT DOCUMENTS

| | | | |
|---|---|---|---|
| 4,436,962 | A | 3/1984 | Davis et al. |
| 5,337,351 | A | 8/1994 | Manabe et al. |
| 6,418,215 | B1 | 7/2002 | Schessel |

(Continued)

FOREIGN PATENT DOCUMENTS

| | | |
|---|---|---|
| CN | 1826778 | 8/2006 |
| GB | 2353916 A | 3/2001 |

(Continued)

OTHER PUBLICATIONS

Chentouf et al. ('experimenting with feature interaction management in SIP environment', Telecommunication Systems 24:2-4, 251-274, 2003, "cited by the applicant of record").*

(Continued)

*Primary Examiner* — Alpus H Hsu
*Assistant Examiner* — Dharmesh Patel (57) ABSTRACT

A method is provided for detecting interactions between call-related and web-enabled features. In some embodiments, communication application components are configured to transmit an indication to a feature interaction detector every time a feature is invoked by the user. When the interaction detector receives an indication that a feature is being invoked, it compares the invoked feature against features that have previously been invoked (or executed) and determines whether the invoked feature interacts with any of the features that have been previously executed.

20 Claims, 7 Drawing Sheets

(51) Int. Cl.
*H04Q 3/00* (2006.01)
*H04L 29/08* (2006.01)

(56) References Cited

U.S. PATENT DOCUMENTS

| | | | |
|---|---|---|---|
| 6,445,782 B1 | 9/2002 | Elfe et al. | |
| 6,535,596 B1 | 3/2003 | Frey et al. | |
| 6,639,980 B1* | 10/2003 | Weiss et al. | 379/201.02 |
| 6,714,634 B1 | 3/2004 | Breeden | |
| 6,741,588 B1 | 5/2004 | Stewart | |
| 6,973,174 B1 | 12/2005 | Koptiw et al. | |
| 7,050,563 B2 | 5/2006 | Dammrose | |
| 7,076,766 B2* | 7/2006 | Wirts et al. | 717/121 |
| 7,120,243 B2 | 10/2006 | Milton | |
| 7,190,776 B2* | 3/2007 | Oman | 379/207.02 |
| 7,515,905 B2* | 4/2009 | Begeja et al. | 455/417 |
| 7,542,768 B2 | 6/2009 | Florkey et al. | |
| 7,548,967 B2 | 6/2009 | Amyot et al. | |
| 7,720,976 B2 | 5/2010 | Chu et al. | |
| 7,782,897 B1 | 8/2010 | Mohaban | |
| 7,788,408 B2 | 8/2010 | Takeda et al. | |
| 7,804,818 B1 | 9/2010 | Atluri et al. | |
| 7,907,712 B2 | 3/2011 | Goguen et al. | |
| 8,284,918 B2* | 10/2012 | Srinivasan et al. | 379/207.02 |
| 2002/0021796 A1 | 2/2002 | Schessel | |
| 2003/0059015 A1 | 3/2003 | Eber et al. | |
| 2003/0108182 A1 | 6/2003 | Dikmen | |
| 2003/0120502 A1 | 6/2003 | Robb et al. | |
| 2004/0153875 A1 | 8/2004 | Amyot et al. | |
| 2004/0179666 A1 | 9/2004 | Milton | |
| 2005/0063359 A1 | 3/2005 | Jagadeesan et al. | |
| 2005/0148362 A1 | 7/2005 | Jagadeesan et al. | |
| 2006/0093115 A1 | 5/2006 | Chen et al. | |
| 2006/0218268 A1 | 9/2006 | Beck et al. | |
| 2006/0229078 A1* | 10/2006 | Itzkovitz et al. | 455/445 |
| 2006/0268678 A1 | 11/2006 | Dhesikan et al. | |
| 2007/0004410 A1 | 1/2007 | Goldman et al. | |
| 2007/0005770 A1* | 1/2007 | Kramer et al. | 709/226 |
| 2007/0116224 A1* | 5/2007 | Burke et al. | 379/201.12 |
| 2007/0224997 A1 | 9/2007 | Florkey et al. | |
| 2008/0052400 A1 | 2/2008 | Ekberg | |
| 2008/0086564 A1* | 4/2008 | Putman et al. | 709/227 |
| 2008/0104238 A1* | 5/2008 | Gilfix et al. | 709/225 |
| 2008/0220775 A1* | 9/2008 | Tischer et al. | 455/435.1 |
| 2009/0191870 A1 | 7/2009 | Siegel et al. | |
| 2010/0008232 A1 | 1/2010 | Zave | |

FOREIGN PATENT DOCUMENTS

| | | |
|---|---|---|
| JP | H01-128653 | 5/1989 |
| JP | H02-051958 | 2/1990 |
| JP | H04-054797 | 2/1992 |
| JP | H10-032636 | 2/1998 |
| JP | 2000-101727 | 4/2000 |
| JP | 2006-254402 | 9/2006 |
| JP | 2007-135204 | 5/2007 |
| JP | 2009-159249 | 7/2009 |

OTHER PUBLICATIONS

Chentouf et al., "Experimenting with Feature Interaction Management in SIP Environment", "http://www.google.com/#sclient=psy&hl=en& q=Experimenting+with+Feature+Interaction+Management+in+ SIP+ Environment&aqi=&aql=&oq=&pbx=1&fp=8ce0e008a607e93", 2003, pp. 251-274, vol. 24, No. 2-4, Publisher: Kluwer Academic Publishers.

Chou et al., "Web Services Methods for Communication over IP", "http://www.google.com/#sclient=psy&hl=en& q=Web+Services+Methods+for+Communication+over+IP+& aq=f& aqi=g-v1g-01&aql=&oq=&pbx=1& fp=8ce0e008a607e93d>", Jul. 2007, pp. 372-379, Publisher: IEEE Computer Society IEEE International Conference on Web Services (ICWS 2007).

Copenheaver, Blaine R., "PCT Application No. PCT/US2010/040435 International Search Report Feb. 8, 2011",, Publisher: PCT, Published in: PCT.

Duong, Duc T., "U.S. Appl. No. 12/392,461 Office Action Mar. 17, 2011",, Publisher: USPTO, Published in: US.

Domingos, Luis, "EP Application No. 09171159.8 European Search Report Jun. 14, 2010"Publisher: EPO, Published in: EP.

Marjou et al., "Best Current Practices for a Session Initiation Protocol (SIP) Transparent Back-To-Back User-Agent (B2BUA)", "SIPPING Working Group Internet Draft XP015051976", Sep. 9, 2007, Publisher: Internet Engineering Task Force.

Beck et al., "Extending Service Mediation to Intelligent VoIP Endpoints", "Bell Labs Technical Journal 2005 XP001540855",, pp. 11-15, vol. 10, No. 1, Publisher: Wiley Periodicals, Inc.

Tsang et al., "The feature interaction problem in networked multimedia services—present and future", "BT Technology Journal XP000688223", Jan. 1997, vol. 15, No. 1, Publisher: Springer.

Buford et al., "Feature Interactions in P2P Overlay Networks", "IEEE Consumer Communications and Networking Conference XP031211883", Jan. 1, 2008, pp. 304-305, Publisher: IEEE.

Chiang et al., "Handling Feature Interactions for Multi-Party Services in 3GPP IP Multimedia Subsystem", "International Conference on IP Multimedia Subsystem Architecture and Applications XP031283340", Dec. 6, 2007, pp. 1-5.

Kolberg et al., "Managing Distributed Feature Interactions in Enterprise SIP Application Servers", "IEEE International Conference on Communications XP031506136", Jun. 14, 2009, pp. 1-6, Publisher: IEEE.

Kolberg et al., "Managing feature interactions between distributed SIP call control services", "Computer Networks www.elsevier.com/locate/comnet XP005758516", Nov. 10, 2006, pp. 536-557, vol. 51, No. 2, Publisher: Elsevier Science Publishers B.V. Amsterdam.

Gouya et al., "Service Broker for Managing Feature Interactions in IP Multimedia Subsystem", "Proceedings of the Sixth International Conference on Networking (ICN '07) XP031214505", Apr. 22, 2007, p. 54 Publisher: IEEE.

Domingos, Luis, "EP Application No. 09171163.0 European Search Report Jun. 14, 2010",, Publisher: EPO, Published in: EP.

Domingos, Luis, "EP Application No. 09171158.0 European Search Report Jun. 11, 2010",, Publisher: EPO, Published in: EP.

Duong, Duc T., "U.S. Appl. No. 12/392,461 Office Action Oct. 8, 2010",, Publisher: USPTO, Published in: US.

* cited by examiner

INTERACTION DETECTION BETWEEN WEB-ENABLED AND CALL-RELATED FEATURES

CROSS REFERENCE TO RELATED APPLICATIONS

The present application claims priority to provisional application 61/221,211 filed on Jun. 29, 2009, entitled Feature Interactions Between Internet Services and Telecommunication Services, which is herein incorporated by reference.

The underlying concepts, but not necessarily the language, of the following cases are incorporated by reference:
  (1) U.S. application Ser. No. 12/392,429 and U.S. Provisional Application 61/145,700, filed on Feb. 25, 2009 and Jan. 19, 2009, respectively.
  (2) U.S. application Ser. No. 12/392,445 and to U.S. Provisional Application 61/145,703, filed on Feb. 25, 2009 and Jan. 19, 2009, respectively.
  (3) U.S. application Ser. No. 12/392,461 and U.S. Provisional Application 61/145,706, filed on Feb. 25, 2009 and Jan. 19, 2009, respectively.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to telecommunications in general, and, more particularly, to feature interaction detection.

BACKGROUND OF THE INVENTION

Over the years a wide variety of communications features (also referred to as services) have been developed, such as call forwarding, three-way calling, music on hold, and so forth. When two or more features are applied to a telephone call, however, it is possible that an interaction between the features might cause unexpected or unwanted behavior, such as permitting policies to be circumvented or causing the call to fail. For example, suppose a call is set up via a meet-me conferencing feature, and then a music-on-hold feature is activated during the call. If one of the call participants goes on hold, then all of the other parties on the call will also hear the music.

SUMMARY OF THE INVENTION

Communication features can be classified as call-related and web-enabled. Call-related features are provided by telephone network nodes, such as PBX switches, service provider switches, service provider feature servers, and others. Examples of such features include call forwarding, three-way calling, voice mail delivery, etc. Web-enabled features, on the other hand, are provided by servers that are not part of the telephone network and are oftentimes delivered over the Internet. Examples of web-enabled features are delivery of voicemail messages over the email, general email access, and Facebook™ access.

Web services are one type of web-enabled features. Web services are typically application programming interfaces (APIs) which are executed on remote system hosting the requested services. Web services are software components that are described via WSDL and are capable of being accessed via standard web-based protocols such as SOAP and HTTP.

Previous work in feature interaction detection has focused on call-related features. For instance, the method of feature interaction detection described in provisional application 61/145,700 uses Session Initiation Protocol (SIP) messages to detect feature interactions. The SIP messages are used to carry indications that features are invoked. This approach, however, is not adaptable to web-enabled features because web-enabled features are not guaranteed to be provided via signaling paths, such as those used to carry Session Initiation Protocol (SIP) messages. Moreover, the web-enabled features may be provided by application widgets that themselves lack Session Initiation Protocol (SIP) capability, and instead rely on other types of communications to request and receive web-enabled features. Therefore, the need exists for a method for detecting interactions between call-related and web-enabled communication features.

The present invention addresses this need by providing a method for detecting interactions between call-related and web-enabled features. In some embodiments, a communication application component is configured to transmit an indication to a feature interaction detector when a feature provided by the component is invoked. When the feature interaction detector receives an indication, it determines whether the invoked feature interacts with other features that have been executed or invoked. In some embodiments, the determination is performed in accordance with pre-defined feature definitions and feature interaction rules.

It is to be understood that the above embodiments and their instances are provided to better illustrate different aspects of the present invention. They are in no way exhaustive of the full scope of the invention. The following disclosure teaches examples of some embodiments of the present invention in detail.

DETAILED DESCRIPTION

The terms appearing below are defined for use in this specification, including the appended claims, as follows:
  "browser based" means an application that is accessed via a web browser. A browser-based application can be retrieved by the browser from the memory of the communication terminal on which the browser is executing or from a remote server.
  "feature invocation" means requesting at least one of the execution, enabling, and activation of the feature.
  "execute" means at least one of the following:

(1) causing a feature to provide a one-time service; for example, when a search feature is executed, it provides a set of search results; when the search feature is executed for a second time, it provides a second set of search results;

(2) causing a feature to become active; once a feature has become active, it starts providing its services to the user on a continuous basis; for example, when a call screening feature is active, it operates block all calls to numbers on a do-not-call list over the time period during which the feature is active; and (3) causing a feature to provide its functionality to the user.

"feature" means a service which is provided to the user of a communication terminal by at least one of (1) the communication terminal OR (2) a server that is remote to the communication terminal OR (3) both the communication terminal and the server that is remote to the communication terminal.

"call-related feature" means a feature that possess the following characteristics:

(1) the feature directly changes the state of a real-time communication session between a communication terminal and another node on a communication network (e.g., another communication terminal, voice-mail server, etc.), and (2) when the feature is not provided by software executing on a communication terminal, the feature is invoked by the communication terminal over a signaling path that is used for the conduct of real-time communication sessions.

"signaling path" is a communication path between two nodes in a communication network (e.g., communication terminals, proxy servers, registrar servers, etc.) that is used by a communication terminal to send and receive signaling that is used for controlling the state of real-time communication sessions, such as telephone calls and video calls, that are enabled by the communication network.

"web-enabled feature" means a feature that possesses the following characteristics:

(1) the feature does not directly change the states of real-time communication sessions; and (2) when the feature is not provided by software executing on a communication terminal, the feature is invoked by the communication terminal over a communication path that is at least partially disjoint from any possible signaling path between the communication terminal and another communication network node.

Figure 1:
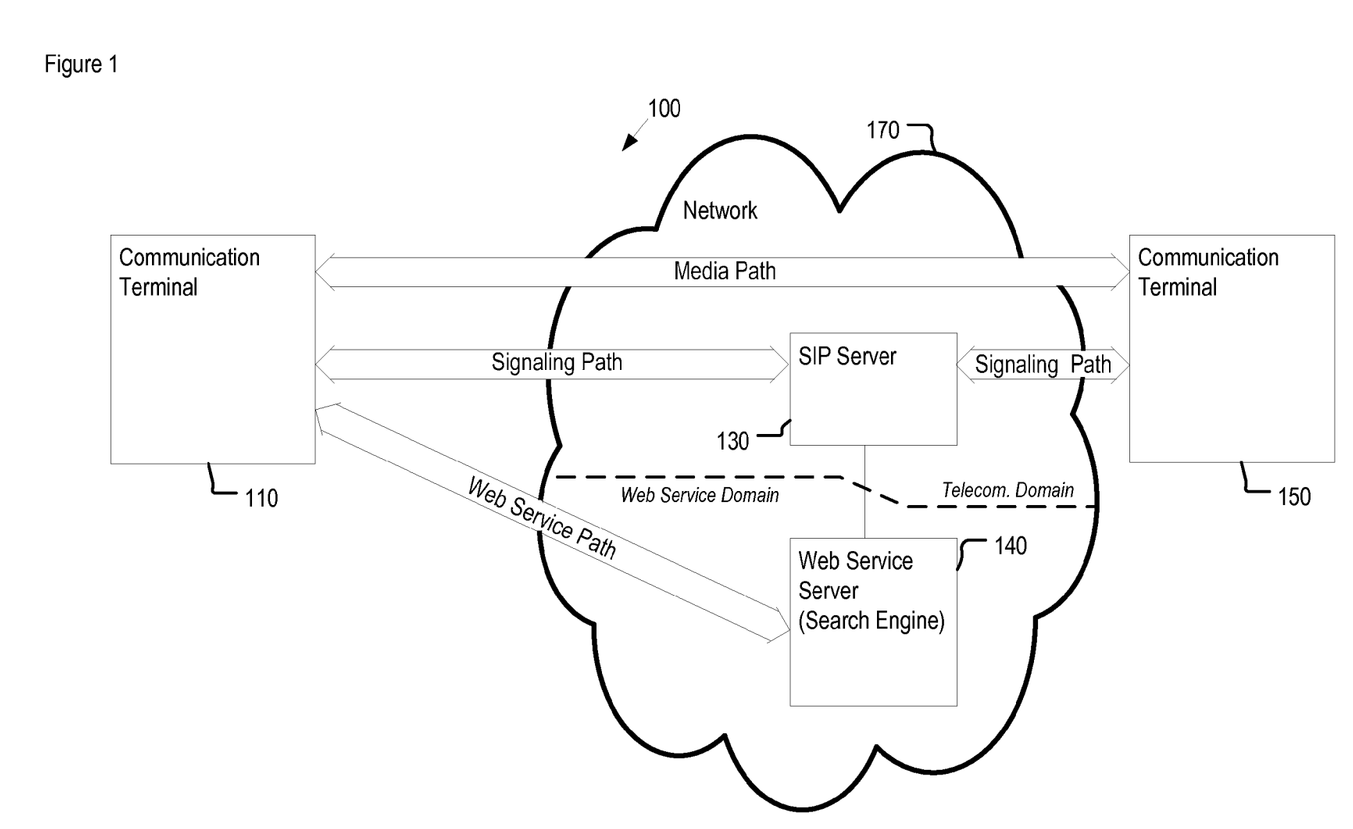
FIG. 1 depicts a schematic diagram of system 100.

FIG. 1 depicts a schematic diagram of system 100. In accordance with the illustrative embodiment of the present invention, system 100 comprises terminal 110, terminal 150, server 130, server 140, and network 170.

Terminal 110 is a cellular telephone. Terminal 110 is connected to the communication network of a telephone service provider. The communication network of the telephone service provider enables terminal 110 to participate in real-time communication sessions, such as telephone calls, video calls, etc. In the illustrative embodiment, the communication network of the telephone service provider is a SIP network. The transport-layer network for the SIP network is a packet-switched network (e.g., the Internet, LAN, WAN, etc.). It will be clear to those skilled in the art, after reading this disclosure, how to make and use alternative embodiments of the present invention in which the communication network uses another type of signaling (e.g., GSM signaling, CDMA signaling, etc.) and operates in conjunction with another type of transport-layer network (e.g., a cellular network, the public switched telephone network, etc.).

In the illustrative embodiment, terminal 110 is engaged in a communication session with terminal 150. The communication session is a Session Initiation Protocol (SIP) telephone call. The telephone call is carried over a signaling path and media path. The signaling path is used for the exchange of communication protocol signaling. And the media path is used for the exchange of voice. It will be clear to those skilled in the art, after reading this disclosure, in which another communication protocol is used (e.g., Skype™, H.323, SS7, etc.).

Server 130 is a node in the communication network of the telephone service provider of terminal 110. In the illustrative embodiment of the present invention server 130 operates as a SIP proxy and is used in establishing the communication session between terminal 110 and terminal 150. In addition, server 130 is capable of providing one or more call-related services, such as call-blocking. Server 130 and terminal 110 communicate via a signaling path.

It will be clear to those skilled in the art, after reading this disclosure, that alternative embodiments of the present invention can be devised in which server 130 is a node in another type of node (e.g., a post office switch, a PBX switch). Furthermore, it will be clear to those skilled in the art, after reading this disclosure, that alternative embodiments of the present invention in which server 130 is a node in another type of network e.g., SIP network, VoIP network, GSM network, CDMA network, Public Switched Telephone Network, etc.). And still furthermore, it will be clear to those skilled in the art, after reading this disclosure, how to make and use alternative embodiments of the present invention in which server 130 is a node dedicated to executing feature interaction detector (FID) 300. (See, e.g., FIG. 3, etc.)

Server 140 provides access to one or more web-enabled features. In particular, server 140 is a server that executes an information retrieval application. The information retrieval application is run as a web-service and it is described in the discussion with respect to FIG. 2.

Terminal 110 communicates with server 140 via a web service path. The web service path is a communication path that is at least partially disjoint from the signaling path. That is, at least one leg of the web service pat is not used for the sending and transmission of communication protocol signaling.

In some embodiments, the web service path is used for the transmission of web-service messages. The web-service messages are encapsulated inside HTTP messages and use SOAP to perform remote procedure calls that are necessary for the invocation of web-enabled features.

In alternative embodiments, the communication path and the web service path are established by terminal 110 via separate interfaces. The web service path is established via a Wi-Fi interface, whereas the signaling part is established via telephony interface (e.g., GSM interface, etc.). Terminal 110 is connected to the Internet via an access point, such as a wireless LAN router, etc. At the same time, terminal 110 uses the telephony interface to connect to a telephony network (e.g. GSM network, etc.) via a cellular network base station.

Network 170 is a communications network that transports signals between server 130, server 140, and terminal 150. In accordance with the illustrative embodiment of the present invention, network 170 is the Internet, but it will be clear to those skilled in the art, after reading this disclosure, how to make and use alternative embodiments of the present invention in which network 150 is another type of communication network (e.g. a local area network, the Public Switched Telephone Network, a cellular network, wide area network, etc.).

Network 170 comprises a telecommunication domain and web service domain. In the illustrative embodiment, the telecommunication domain is an administrative domain comprising server(s) that are managed by a telephone service provider. The web service domain is an administrative domain that is not managed by the telephone service provider. Server 130 is part of the telecommunication domain while server 140 is part of the web service domain.

In some embodiments, the telecommunication domain is a private network (or network with restricted access such as the telephone service provider's network), and the web-service domain another network (e.g., the Internet, etc.). In these embodiments, the telecommunications domain and the web service domain are connected via one or more gateways and have distinct address spaces.

Terminal 150 is a cellular telephone. Those skilled in the art will recognize, after reading this disclosure, how to make and use alternative embodiments of the present invention in which one of terminals 110 and 150 is another communication device, such as, for example, and without limitation, a smart phone, desk set telephone, portable digital assistant (PDA), media streaming server, desktop computer, etc. In the illustrative embodiment, terminals 110 and 150 use the Session Initiation Protocol (SIP). But it will be clear to those skilled in the art, after reading this disclosure, how to make and use alternative embodiments of the present invention in which any signaling protocol is used (e.g., ss7, H.323, etc.).

Figure 2:
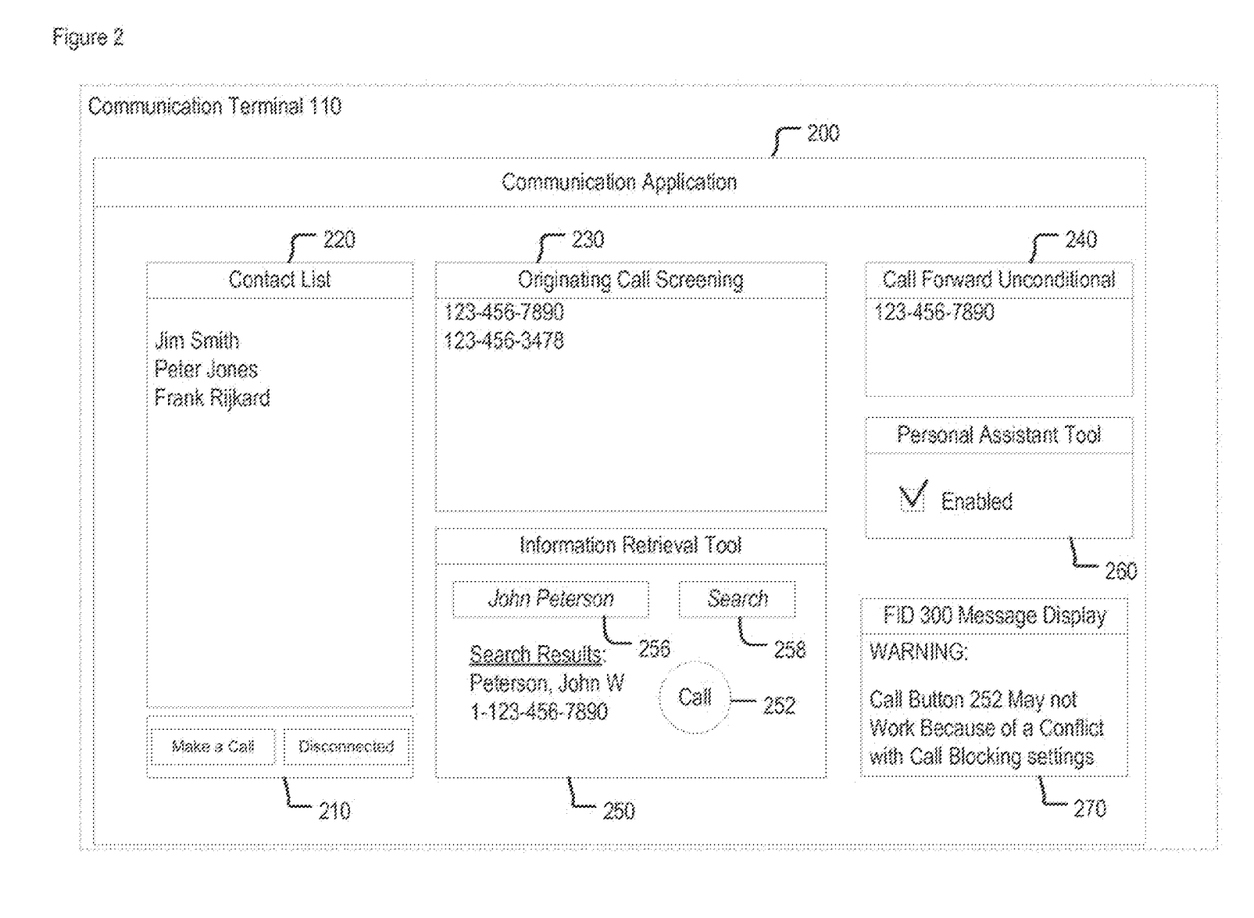
FIG. 2 depicts a schematic diagram of the salient components of terminal 110.

FIG. 2 depicts a schematic diagram of the salient components of terminal 110. In the illustrative embodiment of the present invention, terminal 110 comprises communication application 200.

Communication application 200 is browser-based software for the conduct of communication sessions (e.g., telephone calls, video calls, teleconferences, etc.). In accordance with the illustrative embodiment, communication application 200 uses the Session Initiation Protocol (SIP). It will be clear to those skilled in the art, after reading this disclosure, how to make and use alternative embodiments of the present invention in which any other communication protocol is used (e.g., H.323, Skype, etc.).

Although, in the illustrative embodiment, communication application 200 is a browser-based application, it will be clear to those skilled in the art, after reading this disclosure, how to make and use alternative embodiments of the present invention, in which communication application 200 is any type of communication application known in the art (e.g., non-browser based, etc.). In the illustrative embodiment, communication application 200 comprises a plurality of widgets. It will be clear to those skilled in the art, after reading this disclosure, how to make and use alternative embodiment of the present in which communication application 200 comprises other type(s) of components. Furthermore, it will be clear to those skilled in the art, after reading this disclosure, how to make and use alternative embodiment of the present in which communication application 200 is monolithic. That is, all of its services (or features) of the application are programmed together as a monolith body of code.

As noted, communication application 200 comprises a plurality of widgets. A widget is a component that can be added to a web page (e.g., HTML based document, etc.) by an end user without requiring additional programming of the component. Widgets can provide both web-enabled and call-related features to the user. Widgets have the benefit of being reusable. In accordance with the illustrative embodiment, the widgets are capable of generating one or more event notifications (or indications) when their services are invoked. The event notifications are directed to feature interaction detector (FID) 300 (See, e.g. FIG. 3, etc.) and used to detect feature interactions. Although, in the illustrative embodiment, widgets are used to provide the features of communication application 200, it will be clear to those skilled in the art, after reading this disclosure, how to make and use alternative embodiments of the present invention in which other types of components are used (e.g., non-web-page based components, etc.).

In some embodiments, the widgets are independently addressable by feature interaction detector (FID) 300. Each widget has a unique identifier which permits feature interaction detector (FID) 300 to identify it and transmit information to it. Furthermore, in some embodiments, the independent addressing capability permits feature interaction detector (FID) 300 to poll widgets directly for the occurrence of feature events, such as feature invocation, feature activation, etc.

The widgets are used to provide access to both call-related and web-enabled features. Specifically, some of the widgets provide call-related features while others provide web-enabled features. The features provided by different widgets interact. The interactions are detected by Feature Interaction Detector (FID) 330. (See, e.g., FIG. 3, etc.) In accordance with the illustrative embodiment, communication application comprises six widgets: telephony widget, contact list widget, call screening widget, information retrieval widget, call forwarding widget, and personal assistant widget. The user interfaces for these widgets are depicted in FIG. 2 as telephony widget 210, contact list 220, screening list interface 230, call forwarding information retrieval tool 250, call forwarding tool 240, personal assistant 260, and message widget 270.

Telephony widget 210 provides access to a telephony feature. The telephony feature provides basic telephone call functionality. The telephony feature is a call-related feature.

Contact list interface 220 is the interface to a contact-list feature. The contact list feature allows users of communication application 200 to browse a list of contacts. It will be clear to those skilled in the art how to implement the contact-list feature.

Screening list interface 230 is a user interface that provides access to an outgoing call screening feature. This feature enables users to put one or more users (i.e., telephone numbers, URIs, etc.) on a do-not-call list. Once a telephone number is put on this list, the outgoing call screening feature will prevent terminal 110 from initiating and/or establishing a communication session with that telephone number. The outgoing call screening feature is implemented by server 130. Server 130 stores the do-not-call list and blocks communication attempts to numbers that are present in the list. The outgoing call screening feature is a call-related feature.

Information retrieval tool 250 provides access to an information retrieval feature. The information retrieval feature is a web-enabled feature. Furthermore, the information retrieval feature is a composite feature. It comprises a search feature and a call feature.

The call feature is used to start communications sessions with telephone numbers that are retrieved by the search feature. The call feature is implemented by software executing on terminal 110. The call feature is a call-related feature.

The search feature is a web service. It is implemented as a software application that executes on server 140 and communicates with information retrieval tool via a web service interface. The search feature is a web-enabled feature.

It should be noted that the information retrieval feature is considered to be a web-enabled feature because it is a composite feature that comprises at least one web-enabled feature.

The information retrieval feature enables users to obtain the contact information of other users. In using the information retrieval feature, the user types in the name of a person (e.g., John Peterson, etc.) in text field 256 and then presses search button 258. When button 258 is pressed, the search feature of information retrieval tool 250 transmits a search query to the search feature executing on server 140. The search feature consults a database and returns the contact information of the person specified in the search query.

Furthermore, information retrieval feature provides a user with a call button which can be used to establish a communication session with the user whose contact information is retrieved. When button 252 is pressed, the call feature of the information retrieval feature establishes a communication session with the telephone number retrieved by the search feature.

In some embodiments, information retrieval tool 250 uses a Wi-Fi connection (and a Wi-Fi interface of terminal 110) to contact server 140, and uses a telephony connection (and a GSM interface of terminal 110) to establish the call. In these embodiments, the communication network of the telephone service provider of terminal 110 is uninvolved in the provision of the search feature component of the information retrieval feature.

Call forwarding tool 240 enables the automatic forwarding of telephone calls that are incoming to terminal 110 when the call recipient is busy or not answering. When call forwarding tool 240 is enabled, all incoming calls are automatically forwarded to a specified number (e.g., 123-456-7890). The call forwarding always feature is a call-related feature.

Personal assistant 260 is a front-end to a virtual assistant feature. The virtual assistant is a composite feature. It is composed of both call-related and web-enabled features. It comprises a call-related feature to answer incoming calls and communicate information about scheduled appointments. It also comprises a web-enabled feature that is charged with the tasks of consulting calendars and determining a preferred time to schedule the appointments.

In operation, the virtual assistant answers incoming telephone calls when a call recipient is busy or not answering. Moreover, the virtual assistant consults calendars and appointment books, and schedules appointments for the calling party to call back. The virtual assistant communicates the scheduled appointment by using text-to-speech translation. Generated speech is transmitted to the calling party via telephone connection that is established through the SIP network of server 130.

Message widget 270 is a widget for displaying message(s) (e.g., text messages, graphic messages, audio messages, etc.) from feature interaction detector (FID) 300. (See, e.g., FIG. 3, etc.).

Interaction Between Call-Related Features and Web-Enabled Features

The features of communication application 200 are capable of interacting with one another. For instance, the outgoing call screening and the information retrieval feature can interact sometimes. As depicted in FIG. 2, the telephone number of a person (John Peterson) is searched for and retrieved by information retrieval tool 250. Call Button 252, can be used to start a telephone call with the person (i.e., John Peterson).

At the same time, however, the telephone number of the person (i.e., John Peterson) is listed in outgoing screening list 230. This causes the call screening feature of communication application 200 to block all outgoing calls that are made to the number.

Stated succinctly, a conflict exists in the operation of the call screening and information retrieval features. If the user clicks on button 252, one of two things will happen. Either a telephone call with number "1-123-456-7890" will be established, or the telephone call setup attempt will fail because it is blocked by the outgoing call screening feature. In either scenario, one of the features is not going to operate as expected by the user.

Notably, if the interaction, or conflict, is caught ahead of time, it can be mitigated. For instance, a message can be transmitted to communication application 200 warning the user that call button 252 may not work as expected because of conflicts with the call-blocking feature. In the illustrative embodiment, such a message is displayed by message widget 270.

Another example of feature interaction is the interaction between call forwarding tool 240 and personal assistant 260. The former forwards calls automatically when a recipient is not available, while the latter answers these calls on behalf of the recipient to schedule a call-back appointment. Only one of the two features can execute, however. An incoming call can either be answered by the virtual assistant or forwarded to a third-party number, but not both. If this conflict is caught ahead of time, it can be mitigated by allowing only the call forwarding tool to execute while blocking the execution of the personal assistant.

Interactions Between Features that are Invoked by Different Communication Terminals The illustrative embodiment of the present invention describes interactions between features that are invoked by the same communication terminal. It will be clear to those skilled in the art, however that features that are invoked by different communication terminals can also interact with one another. An example of one such interaction is provided in the "Background" section of this disclosure. The "Background" section describes a conflict between a meet-me conferencing feature and music-on-hold feature. The conference feature is invoked by all terminals that participate in the conference, whereas the music-on-hold feature is invoked by one terminal only. Yet, the invocation of the music-on-hold feature by one terminal affects all other terminals since they also hear the music.

Figure 3:
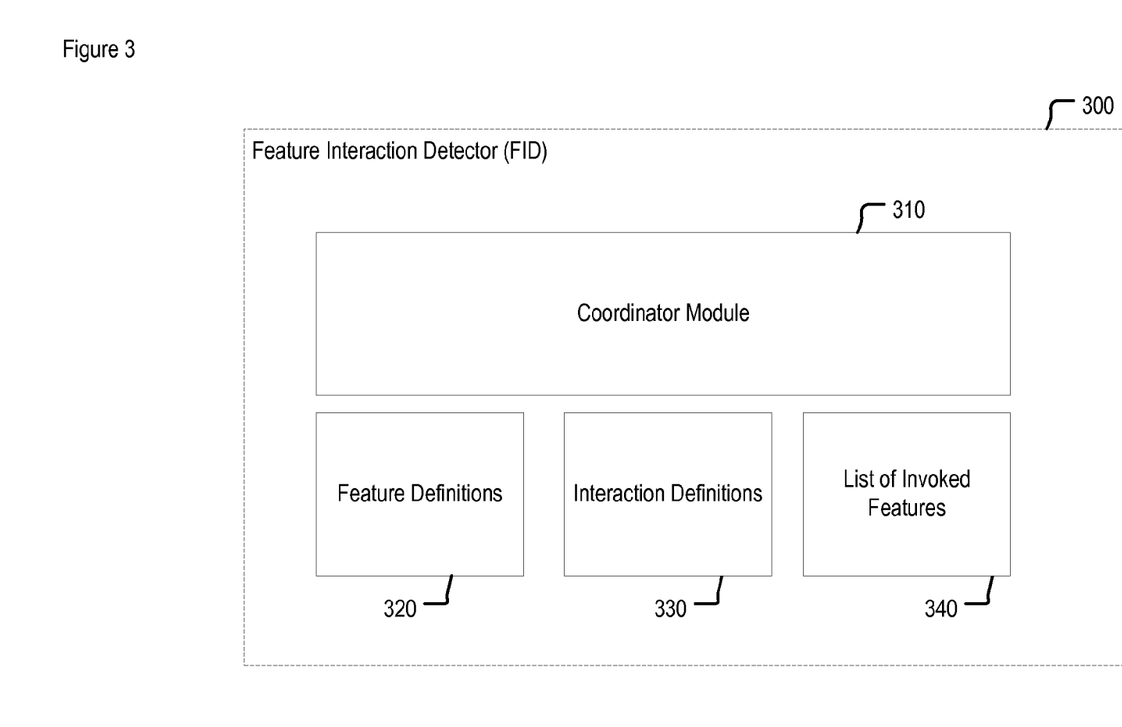
FIG. 3 depicts a schematic diagram of the salient components of the illustrative embodiment of the present invention.

FIG. 3 depicts a schematic diagram of the salient components of the illustrative embodiment of the present invention. FIG. 3 depicts a schematic diagram of feature interaction detector (FID) 300 and its salient components. Feature interaction detector (FID) comprises coordinator module 310, feature definitions 320, interaction definition 330, and list of invoked features 340.

Coordinator module 310 is logic for the detection and resolution of feature interactions. In the illustrative embodiment, coordinator module 310 is implemented in software. In alternative embodiments, however, coordinator module 310 is implemented in hardware. The operation of coordinator module 310 is further described in the discussion with respect to FIGS. 5, 6, and 7.

Record 320 is a record of one or more feature definitions. Each definition comprises at least one of a precondition, post condition, and a triggering event. A precondition is a predicate that must always be true in order for a feature to be executed. A post condition is a condition or predicate that must always be true after the execution of a feature. A triggering event is an occurrence that causes the execution of a feature.

In accordance with the illustrative embodiment, feature definitions 320 comprises the following feature definitions:

TABLE 1

Feature definitions

| Feature name | Trigger | Pre-condition | Action | Post-condition |
|---|---|---|---|---|
| virtual assistant | $E_c$(incoming) | $S_c(C_1)$ = early, $C_1$ = call(local, remote) $S_d$(local) = busy, $S_u$(local) = busy, $S_d$(bridge) = avail, | bridged extension: answer( ) | $S_c(C_1)$ = held, $S_c(C_2)$ = confirmed, $C_2$ = call(bridge, remote), $S_d$(local) = busy, $S_u$(local) = busy, $S_d$(remote) = busy, $S_u$(remote) = busy, $S_d$(bridge) = busy |
| information retrieval | $E_c$(incoming) $\|\|$ $E_c$(outgoing) | $S_c(C_1)$ =¬ terminated, $C_1$ = call(local, remote) $S_i$(caller-id) = unavail | retrieve-info(caller-id) | $S_i$(caller-id) = ready $E_i$(ir-done(caller-id)) $S_c(C_1)$ =¬ terminated |
| call forwarding | $E_c$(incoming) | $S_c(C_1)$ = early, $C_1$ = call(local, remote) | referred-to = select(forwarded-to), connect(remote, forwarded-to), disconnect(local) | $S_c(C_1)$ = terminated, $S_c(C_2)$ = trying\| proceeding\| early\| confirmed, $C_2$ = call(forwarded-to, remote), $S_d$(local) = avail, $S_u$(local) = avail, $S_d$(remote) = busy, $S_u$(remote) = busy |
| originating call screening | $E_c$(outgoing) | $S_c(C_1)$ = early, $C_1$ = call(local, remote) | disconnect(local) | $S_c(C_1)$ = terminated, $S_d$(local) = avail, $S_u$(local) = avail, $S_d$(remote) = avail, $S_u$(remote) = avail |

Below is a list of definitions of the abbreviations used in Table 1:
S—stands for state,
$C_i$—stands for call,
E—stands for triggering event,
local—stands for the party that initiates a communication,
remote—stands for a party that is contacted by the local party,
u—stands for user,
d—stands for device,
c—stands for call,
v—stands for voicemail,
e—stands for email.

Thus, the notation for the post condition "$S_c(C_1)$=¬ terminated," that is required for the information retrieval feature, means that a user must not be prevented from calling the party whose information is retrieved. That is, the called user must not be on a do-not-call list.

The notation for the post condition "$S_c(C_1)$=terminated," that is required for the originating call screening feature, means that the state of a call to a party must be terminated. In other words, a user is precluded from starting communication sessions with parties on a "do-not-call list."

The notation of the triggering event E(incoming call), which is a triggering event for both the call forwarding and personal assistant features, means that the features are triggered by the receipt of an incoming call.

Record 330 is a record of one or more interaction definitions. The interaction definitions specify conditions that can be used by coordinator module 310 to detect feature interactions. For the purposes of this disclosure, the term "interaction definition" is defined as an association between (i) at least one of a precondition, postcondition, and triggering event for a first feature and (ii) at least one of a precondition, postcondition, and triggering event for a second feature.

In the illustrative embodiment, three types of interactions are defined: concurrency conflicts, disabling conflicts, and result conflicts.

Concurrency Conflicts

Concurrency conflicts exist when two features have inconsistent pre-conditions, and thus cannot be executed at the same time. In the illustrative embodiment, concurrency conflicts are defined as follows:

$$(\exists c_1 \epsilon \text{pre}(F_1)) \wedge (\exists c_2 \epsilon (\text{pre}(F_2)) \wedge \text{trigger}(F_1) = \text{trigger}(F_2) \rightarrow (c_1 \rightarrow ¬ c_2)$$

According to this definition, a concurrency conflict exists when: (1) the precondition of one feature is the negation of a precondition of a second feature; and (2) both the first feature and the second feature have the same triggering event.

Disabling Conflicts

Disabling conflicts occur when the execution of a first feature leaves system 100 in a state in which a second feature cannot be executed. An example of a disabling conflict is an interaction between the call screening feature and the information retrieval feature. As discussed with respect to FIG. 2, when a user is put on the "do-not-call-list" of the call screening feature, that user cannot be called by using call button 252 of the information retrieval feature. In other words, once the call screening feature is executed (or enabled) the system is put in a state in which the user cannot be called any more.

In the illustrative embodiment, disabling conflicts are defined as follows:

$$(\exists c_1 \epsilon \text{post}(F_1)) \wedge (\exists c_2 \epsilon (\text{pre}(F_2)) \wedge \text{trigger}(F_1) \neq \text{trigger}(F_2) \rightarrow (c_1 \rightarrow ¬ c_2)$$

According to this definition, a disabling conflict exists when: (1) a post condition for a first feature is the negation of a precondition for a second feature, and (2) the first feature and the second feature have non-equivalent triggering events.

Results Conflicts

Results conflicts occur when two actions would leave the system in an inconsistent (impossible) state and thus cannot be executed simultaneously. An example of a results conflict is the conflict between the call forwarding and personal assistant features. As discussed, the call forwarding feature automatically forwards a call when the call recipient is busy. The personal assistant, on the other hand, answers incoming calls when the call recipient is busy. Since, a call cannot be both automatically forwarded and answered at the same time, the execution of the two features would leave the system (i.e., system 100) in an impossible state.

In the illustrative embodiment, results conflicts are defined as follows:

$$(\exists c_1 \epsilon\, post(F1)) \wedge (\exists c_2 \epsilon (post(F2)) \wedge trigger(F1) = trigger(F2) \rightarrow (c_1 \rightarrow^{\neg} c_2)$$

According to this definition, a results conflict exists when: (1) a post condition for a first feature is the negation of a post condition for a second feature; and (2) the first feature and the second feature have the same triggering event.

Predicate Relationships

The definitions of the feature interactions, in the illustrative embodiment, depend on predicate relationships. For instance, in order for a concurrency conflict to exist, a precondition for a first feature must be the negation of a precondition of another feature. In accordance with the illustrative embodiment, a precondition is said to be the negation of another precondition when the two preconditions are identified as incompatible by an administrator. In the illustrative embodiment, the identification is performed by inputting a table into feature interaction detector (FID) 300 which identifies the two conditions as incompatible.

Similarly, a postcondition is said to be the negation of another postcondition, when the two postconditions are identified as incompatible by an administrator. In the illustrative embodiment, a table entry is input into feature interaction detector (FID) 300 which identifies the two postconditions as incompatible.

Additionally, the definitions of feature conflicts depend on triggering event associations. For instance, a first feature and a second feature can have a results conflict only when a triggering condition for the first feature is equivalent to a triggering condition for the second feature. In accordance with the illustrative embodiment, the two triggering events are equivalent only when they are the same. In some embodiments however, triggering events are considered equivalent when they are defined as such. That is, a table entry is input into feature interaction detector (FID) 300 which identifies two triggering events as equivalent.

Record 340 is an information record that identifies one or more features that have been invoked. It will be clear to those skilled in the art, after reading this disclosure, how to make and use alternative embodiments of the present invention in which record 340 identifies one or more features that have been executed.

In the illustrative embodiment, record 340 identifies features that have been invoked by both terminal 110 and terminal 150. In alternative embodiments, however, record 340 identifies features that have been invoked by terminal 110 only.

In accordance with the illustrative embodiment of the present invention, feature interaction detector (FID) 300 implements the predicate-based model described in provisional application 61/221,211. It will be clear to those skilled in the art, after reading this disclosure, how to make and use alternative embodiments of the present invention can be devised, in which other models are used to detect feature interaction. Examples of such models include the model disclosed in U.S. application Ser. No. 12/392,429, expert systems, etc.

Figure 4:
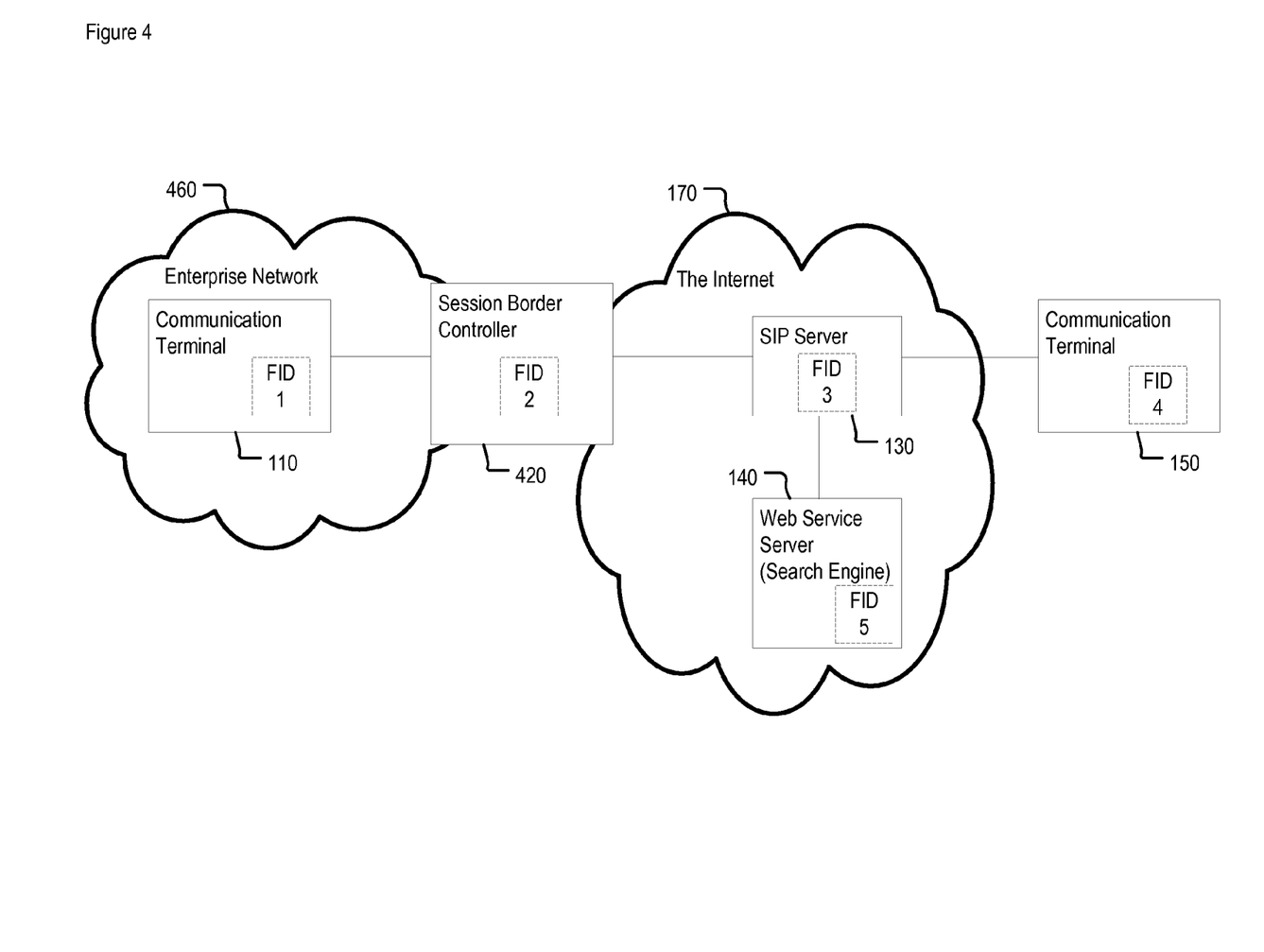
FIG. 4 depicts a schematic diagram of the salient components of the illustrative embodiment of the present invention.

FIG. 4 depicts a schematic diagram of the salient components of the illustrative embodiment of the present invention. In particular, FIG. 4 depicts different possible locations in the topology of a communication network where feature interaction detector (FID) 300 can be executed.

Network 460 is an enterprise network. Terminal 110 is part of network 460. Network 460 possesses an address space that is distinct from the address space of network 170. Network 460 is separated from network 170 by session Border Controller (SBC) 420.

In a first illustrative embodiment, feature interaction detector (FID) 300 is executed on terminal 110. In some embodiment, feature interaction detector (FID) 300, or parts of it (e.g., coordinator module 310, etc.) is implemented as a browser plug-in. In other embodiments, feature interaction detector (FID) is implemented as a free-standing application.

An advantage of the first illustrative embodiment is that it is convenient for feature interaction detector (FID) 300 to determine what features are invoked by terminal 110. A disadvantage, however, is that feature interaction detector (FID) 300 might not be able to obtain information about the execution of features on terminal 150. The difficulty comes from the possibility that session border controller (SBC) 420, as well as firewalls that separate network 460 from network 170, may block information that is pertinent to the operation of feature interaction detector (FID) 300 (e.g., indications that features are invoked on terminal 150, indication of the existence of conflicts, etc.).

In a second illustrative embodiment of the present invention, feature interaction detector (FID) 300 is executing on session border controller (SBC) 420. Session border controller (SBC) 420 is a device used in Voice over Internet Protocol (VoIP) applications to exert control over signaling used in the establishing of communication sessions. A primary function of a session border controller (SBC) 420 is to hide domain routing and endpoint identities from external endpoints and signaling elements. In the illustrative embodiment, session border controller (SBC) 420 connects network 460 to network 170. All communication protocol signaling transmitted by terminal 110 to devices in network 170, passes through session border controller (SBC) 420.

Executing feature interaction detector (FID) 300 on session border controller (SBC) 420 enables feature interaction detector (FID) 300 to obtain information inside P-Con Type headers of messages that are transmitted by terminal 150 before this information is deleted by the other components of session border controller (SBC) 420. As is discussed, in application 61/145,700, the information in P-Con Type can be used in identifying call-related features that are invoked by terminal 110. Furthermore, executing feature interaction detector (FID) 300 on session border controller (SBC) 420 enables feature interaction detector (FID) 300 to receive information in P-Con Type headers of messages transmitted by terminal 110 before this information is deleted.

In a third illustrative embodiment of the present invention, feature interaction detector (FID) 300 executes on server 130. In some embodiments, feature interaction detector (FID) 300 operates as a back-to-back user agent (B2BUA) which receives signaling messages from terminal 110 and/or terminal 150. In these embodiments, feature interaction detector (FID) 300 receives one or more SIP messages that identify one or more call-related features that are or have been activated. The messages are transmitted as part of the communications session of between terminal 110 and terminal 150. That is, the messages carry an identifier that has been assigned by the SIP network (i.e., network of server 130) to the communication session between terminal 110 and terminal 150.

Additionally, feature interaction detector (FID) 300 receives indications that web-enabled features are or have been invoked by terminals 110 and/or 150. The indications for the web-enabled features are received, however, in messages that are not part of the communication session between terminals 110 and 150. Examples of messages that can be used to deliver indications for the web-enabled features include HTTP messages, SOAP messages, etc.

In a fourth illustrative embodiment, feature interaction detector (FID) 300 is executed on terminal 150.

In a fifth illustrative embodiment of the present invention feature interaction detector (FID) 300 is executed on server 140.

In a sixth illustrative embodiment, feature interaction detector (FID) 300 is executing on a communications node (e.g., switch, PBX, etc.). In this embodiment, feature interaction detector (FID) 300 detects at least one of the invocation, execution, and activation of call-related features by monitoring treatments which are transmitted on the line connecting terminal 120 and 150. As is well known, treatments are announcement tones received that are triggered by the network to handle certain conditions during a call (e.g., when a call is screened, when a call is blocked, etc.). Potentially, there might by multiple treatments involved in a particular call.

Figure 5:
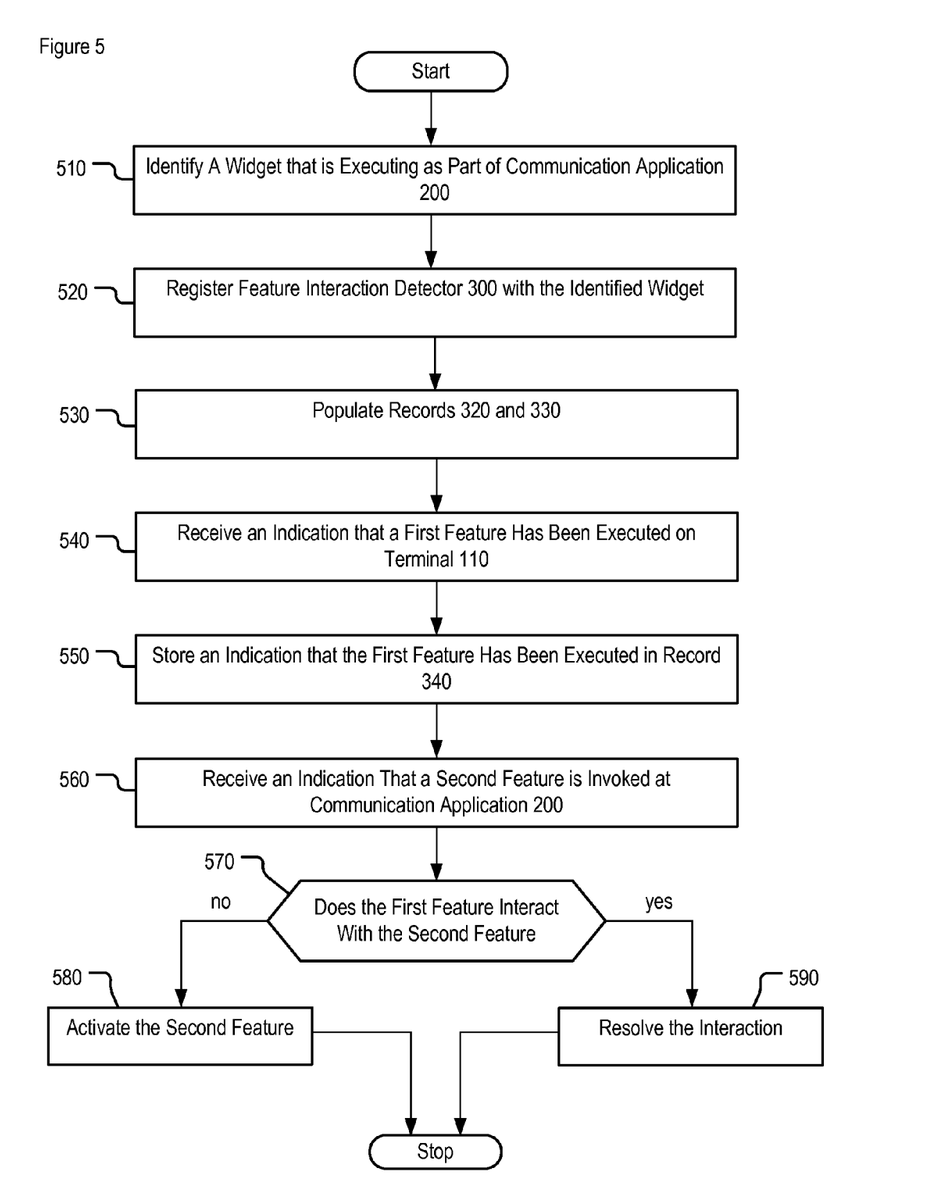
FIG. 5 depicts a flowchart of the salient tasks associated with the operation of the illustrative embodiment of the present invention.

FIG. 5 depicts a flowchart of the salient tasks associated with the operation of the illustrative embodiment of the present invention.

At task 510, coordinator module 310 identifies a widget that is part of communication application 200. In embodiments where coordinator module 310 is implemented as a browser plug-in, coordinator module 310 interacts with the web-browser running communication application 200 to determine what widgets are constituted part of the application. In alternative embodiments, however, coordinator module 310, exchanges communications with communication application 200 in order to make this determination.

At task 520, coordinator module 310 registers with the identified widget. When coordinator module 310 has registered with the widget, the widget starts transmitting event notifications to coordinator module 310. The event notifications serve to notify coordinator module 310 that the state of a feature has changed. Examples of event notifications include indications that a feature provided by the widget is invoked, indications that a feature provided by the widget has been executed, etc.

In some of the embodiments where feature interaction detector (FID) 300 is executing on server 130, at least one of tasks 510 and 520 are executed in response to the receipt of a registration attempt by terminal 110 to register on the Session Initiation Protocol (SIP) network of server 130. In some of the embodiments where feature interaction detector (FID) 310 is executing on terminal 110, at least one of tasks 510 and 520 is executed in response to the starting of communication application 200.

At task 530, feature definition(s) and interaction definition(s) are stored in records 320 and 330. In the illustrative embodiments of the present invention, records 320 and 330 are populated manually by an administrator. In some embodiments, however, the feature definition(s) and interaction definition(s) are obtained from a remote server upon request by feature interaction detector (FID) 300. For instance, in some embodiments, coordinator module 310 submits a query to a remote server requesting the definition of one or more features that are identified at task 510. In response, the remote server transmits the definition to coordinator module 310 which proceeds to store it in record 320.

At task 540, coordinator module receives an indication that an event concerning a first feature has occurred. In the illustrative embodiment, the event is a change in the state of the first feature. Examples of events include the invocation of a feature, execution of a feature, enabling of a feature, and others.

In accordance with the illustrative embodiment, at task 540 coordinator module 310 receives an indication that the first feature has been executed. It will be clear to those skilled in the art, after reading this disclosure, how to make and use alternative embodiments of the present invention in which coordinator module 310 receives another indication, such as, for example, and without limitation, an indication that the first feature has been invoked, etc.

Furthermore, in the illustrative embodiment, the first feature is executed on terminal 110. In alternative embodiments, however, the feature is executed on terminal 150. Furthermore, in the illustrative embodiment, the feature is call-related. In other embodiments, however, the feature is web-enabled.

At task 550, coordinator module 310 stores the indication received at task 540 in record 340.

At task 560, coordinator module 310 receives an indication that an event concerning a second feature has occurred. In the illustrative embodiment, the event is a change in the state of the second feature. Examples of events include the invocation of a feature, execution of a feature, execution of a feature, and others.

In the illustrative embodiment, coordinator module 310 receives an indication that the second feature has been invoked. It will be clear to those skilled in the art, after reading this disclosure, how to make and use alternative embodiments of the present invention in which coordinator module 310 receives another indication, such as, for example, and without limitation, an indication that the second feature has been executed, etc.

The indication concerning the second feature is provided by the widget with which coordinator module 310 is registered at task 520. As discussed, the widget is configured to transmit an event notification to event coordinator 310 every time the feature which it provides is executed. Furthermore, in the illustrative embodiment, the feature is web-enabled. In other embodiments, however, the feature is call-related.

In embodiments where coordinator module 310 receives an indication that the second feature has been executed, feature interaction detector (FID) 300 does little to prevent the interaction, or conflict, from taking place. In these embodiments, however, feature interaction detector (FID) 300 transmits a message to message widget 270. The message warns the user of any unexpected behavior of communication application 200 that might be occurring as a result of the conflict.

At task 570, coordinator module 310 determines whether the second feature and the first feature interact. The manner in which coordinator module determines whether the features interact is further described in the discussion with respect to FIG. 6. If the two features do not interact, coordinator module 310 proceeds to execute task 580. If the two features interact, coordinator module 310 proceeds to execute task 590.

Furthermore, although in the illustrative embodiment, the present invention uses the predicate-based rules described in the discussion with respect to FIG. 3, it will be clear to those skilled in the art, after reading this disclosure, how to make and use alternative embodiments of the present invention in which other types of rules are used. In particular, those skilled in the art will recognize that in alternative embodiments of the present invention, feature interaction detector (FID) 300 operates in accordance with the rules, definitions and principles described in application 61/145,700. Furthermore, it will be clear to those skilled in the art, how to make and use alternative embodiments of the present invention, which involve other well-known in the art methods for performing feature interaction detection such as using a rule-matching engine of an expert system, a logic program, a constraint-satisfaction system, a naïve brute force search, etc.

At task 580, coordinator module 310 activates the second feature. In accordance with the illustrative embodiment, coordinator module 310 transmits a message to communication application 200 indicating that the widget can proceed with the execution of the invoked feature. It will be clear to those skilled in the art, however, that alternative embodiments of the present invention can be devised in which coordinator module 310 takes no action when the two features interact.

In the illustrative embodiment, the widget proceeds to execute the feature after receiving an indication that the first feature and the second feature do not interact. For instance, if the second feature is the information retrieval feature described in the discussion of FIG. 2, information retrieval tool 250 would contact server 140 with a search query only after receiving permission from coordinator module 310. In other words, in the illustrative embodiment of the present invention, the widgets, or components, of communication application 200 are configured to proceed with the execution of a feature only after receiving permission from feature interaction detector (FID) 300. It will be clear to those skilled in the art, after reading this disclosure, that alternative embodiments of the present invention can be devised in which the widgets are configured to execute unless they receive a message denying permission to execute the feature.

Furthermore, it will be clear to those skilled in the art, after reading this disclosure, how to make and use alternative embodiments of the present invention in which feature interaction detector (FID) 300 does not directly interfere with execution of the second application. In some of these embodiments, the function of feature interaction detector (FID) 300 is limited to transmitting notifications of feature interaction notifications to message widget 270.

At task 590, coordinator module 310 resolves the interaction between the two features. In accordance with the illustrative embodiment of the present invention, coordinator module transmits an indication to communication application 200 instructing it to not execute the second feature. It should be noted that the present invention is not limited to any particular way of resolving feature interactions. Those skilled in the art will readily recognize that a number of ways exist for resolving feature interactions (or conflicts) once they are executed. For example, and without limitation, such resolutions include do not execute the second feature, transmit a message warning the user of the conflict, etc.

Tasks 510 through 590 are described for illustrative purposes. It will be clear to those skilled in the art, after reading this disclosure, how to perform the tasks associated with FIG. 5 in a different order than represented or to perform one or more of the tasks concurrently. Furthermore, it will be clear to those skilled in the art, after reading this disclosure, how to make and use alternative embodiments of the present invention that omit one or more of the tasks.

Figure 6:
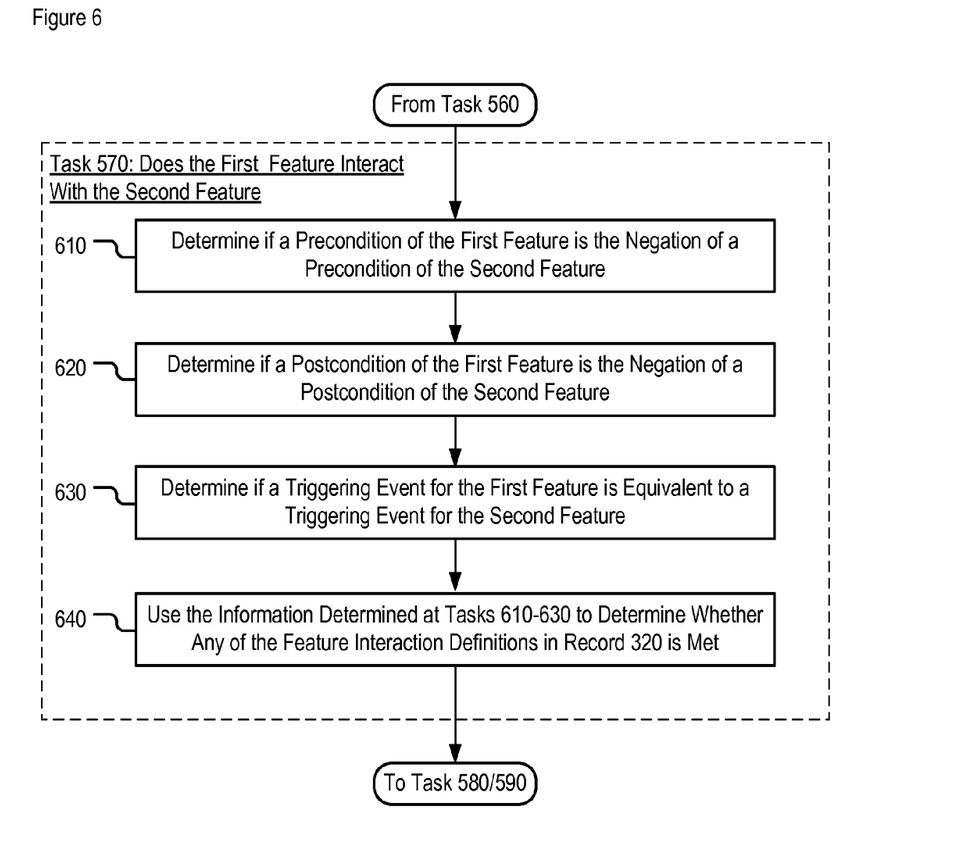
FIG. 6 depicts a flowchart of the salient subtasks associated with the execution of task 570.

FIG. 6 depicts a flowchart of the salient subtasks associated with the execution of task 570.

At task 610, coordinator module 310 determines whether a precondition for the first feature is the negation of a precondition for the second feature. In particular, coordinator module 310 identifies pairs of preconditions by consulting record 320, wherein one member of each pair is a precondition for the first feature while the other member is a precondition for the second feature. After a pair is identified, coordinator module 310 determines whether the preconditions are each other's negation by consulting a table (or another type of record) which identifies precondition negations.

At task 620, coordinator module 310 determines whether a postcondition for the first feature is the negation of a postcondition for the second feature. In particular, coordinator module 310 identifies pairs of postconditions by consulting record 320, wherein one member of each pair is a postcondition for the first feature while the other member is a postcondition for the second feature. After a pair is identified, coordinator module 310 determines whether the postconditions are each other's negation be consulting a table (or another type of record) which identifies postcondition negations.

At task 630, coordinator module 310 determines whether a triggering event for the first feature is equivalent to a triggering event for the second feature. In particular, coordinator module 310 identifies pairs of triggering events by consulting record 320, wherein one triggering event member of each pair is a triggering event for the first feature while the other pair member is a triggering event for the second feature. After each pair is identified, coordinator module 310 consults a table which identifies pairs of triggering events as equivalent.

At task 640, coordinator module 310 compares the information gathered at tasks 610 through 630 against the interaction definitions stored in record 330 and determines whether any of the interaction definitions is met. If yes, coordinator module 310 determines that the first feature and the second feature interact.

Tasks 610 through 640 are described for illustrative purposes. It will be clear to those skilled in the art, after reading this disclosure, how to perform the tasks associated with FIG. 6 in a different order than represented or to perform one or more of the tasks concurrently. Furthermore, it will be clear to those skilled in the art, after reading this disclosure, how to make and use alternative embodiments of the present invention that omit one or more of the tasks.

Figure 7:
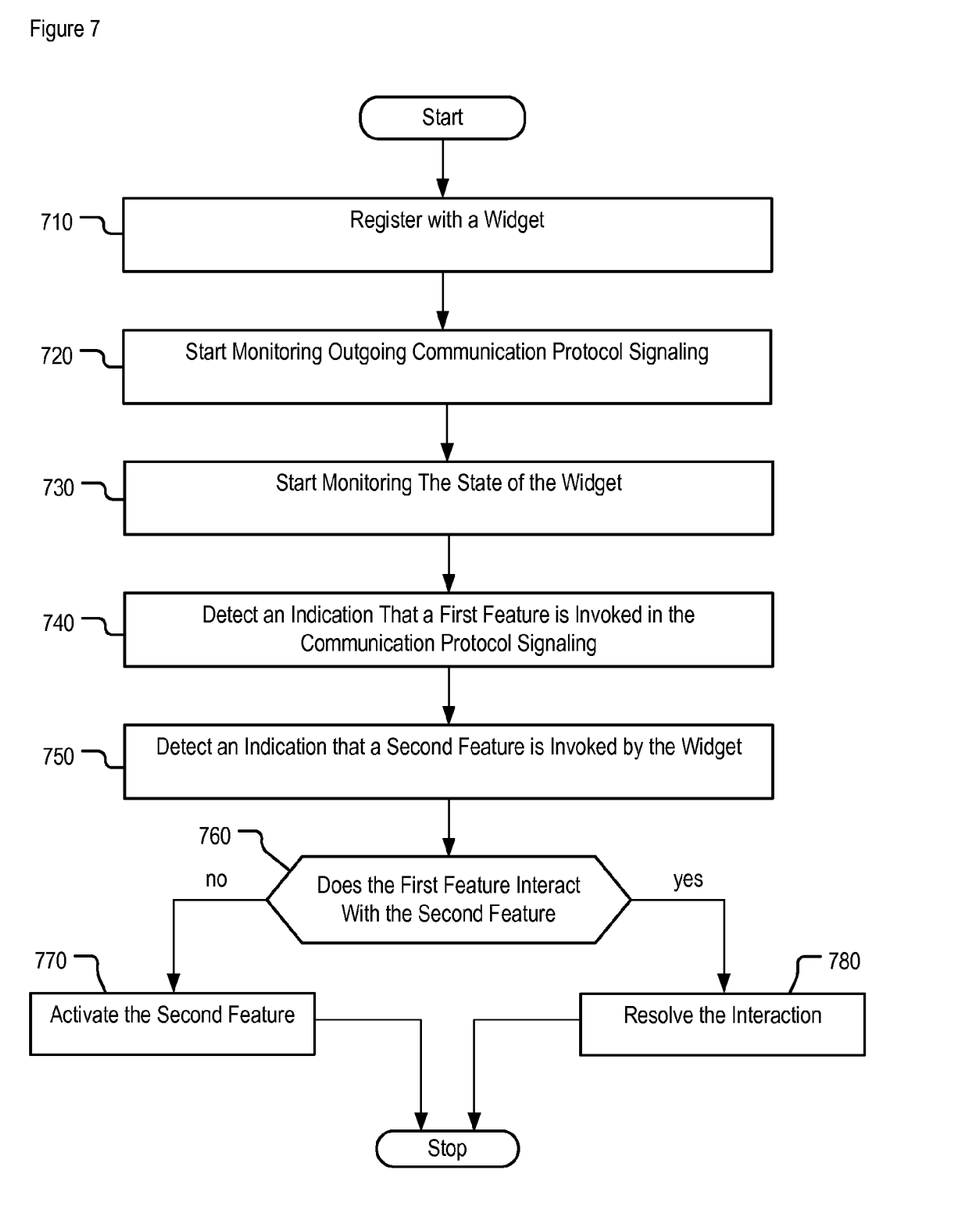
FIG. 7 depicts a flowchart of the salient tasks associated with the operation of an alternative embodiment of the present invention.

FIG. 7 depicts a flowchart of the salient tasks associated with the operation of another illustrative embodiment of the present invention. In accordance with this illustrative embodiment, feature interaction detector (FID) 300 is executing on a SIP server. The SIP server (e.g., SIP proxy, server running a B2BUA, etc.).

At task 710, feature interaction detector (FID) 300 registers with a widget of communication application 200. In the illustrative embodiment, the registration is performed by feature interaction detector (FID) 300 contacting communication application 200 and submitting information which can be used by the widgets in transmitting event notifications to feature interaction detector (FID) 300 (e.g., IP address, etc.). Once feature interaction detector (FID) 300 has been registered with the widget, the widget begins transmitting event notifications to feature interaction detector (FID) 300. Exemplary events include feature activation, feature execution, feature invocation, etc In alternative embodiments, however, the widgets contact feature interaction detector (FID) 300 directly once they are loaded by communication application 200. In these embodiments, feature interaction detector (FID) 300 interacts with each widget directly.

At task 720, feature interaction detector (FID) 300 starts monitoring outgoing communication protocol signaling that is transmitted by terminal 110. In accordance with the illustrative embodiment, the monitored signaling is outgoing SIP messages. In particular, feature interaction detector (FID) 300 monitors whether any of the transmitted messages contain an indication that an event has occurred. Exemplary events include feature activation, feature execution, feature invocation, etc. The indication can be contained in the P-Con Type headers of the SIP messages or elsewhere.

At task 730, feature interaction detector (FID) 300 starts monitoring the state of the widget with which coordinator module has registered at task 720. In the illustrative embodiment, monitoring the state of the widget entails at least one of (i) determining whether a feature provided by the widget is invoked, (ii) determining whether a feature provided by the widget is executed, and (iii) identifying any other change in the status of the feature provided by the widget.

In accordance with the illustrative embodiment, feature interaction detector (FID) 300 starts listening for event notification by the widget that is registered at task 710. The event notifications indicate changes in the state of the widget. Exemplary event notifications include, an indication that feature provided by a widget is invoked, indication that a feature provided by a widget is executed, etc.

In the illustrative embodiment, feature interaction detector (FID) 300 listens passively. In alternative embodiments, however, feature interaction detector (FID) 300 periodically polls the widget to determine whether change(s) in the state of the widget have occurred. The polling of the widget utilizes the widget's independent-addressing functionality.

Executing task 730 enables feature interaction detector (FID) 300 to catch changes in the states of features that do not involve the SIP network over which the signaling monitored at task 720 is transmitted. As discussed widgets are independently addressable. They can utilize the capabilities of the web browser executing communication application 200 and request services from servers that are not part of the communication protocol network (e.g., the SIP network of the telephone network provider to which server 130 belongs, etc.). When services are requested independently of the communications network, there is no way for the SIP server to detect that by monitoring the SIP signaling. The execution of task 730, thus, provides the SIP server to stay appraised of changes in the state(s) of feature, even when the request/execution of these features does not involve the communication network to which the SIP server belongs in any way.

At task 740, feature interaction detector (FID) 300 detects that a first feature has been invoked. In accordance with the illustrative embodiment, the detection is completed by monitoring the outgoing communication protocol signaling that is started at task 720.

In accordance with the illustrative embodiment, feature interaction detector (FID) 300 detects feature invocation. It will be clear to those skilled in the art, however, that alternative embodiments of the present invention can be devised in which feature interaction detector (FID) 300 in which feature interaction detector (FID) 300 detects that a feature has been executed.

At task 750, feature interaction detector (FID) 300 detects that a second feature has been invoked. In accordance with the illustrative embodiment, the detection is completed by the listening (and/or polling) started at task 740.

In accordance with the illustrative embodiment, feature interaction detector (FID) 300 detects feature invocation. It will be clear to those skilled in the art, however, that alternative embodiments of the present invention can be devised in which feature interaction detector (FID) 300 in which feature interaction detector (FID) 300 detects that a feature has not just been just invoked, but rather that the feature has been executed.

At task 760, feature interaction detector (FID) 300 determines whether the second feature and the first feature interact. If the two features do not interact, feature interaction detector (FID) 300 proceeds to execute task 770. If the two features interact, feature interaction detector (FID) 300 proceeds to execute task 780. Task 760 is identical to task 570.

At task 770, feature interaction detector (FID) 300 activates the second feature. Task 770 is identical to task 580.

At task 780, feature interaction detector (FID) 300 resolves the interaction between the two features. Task 780 is identical to task 590.

It is to be understood that although the illustrative embodiment of FIG. 7 is discussed in the context of a SIP network and SIP node executing feature interaction detector (FID) 300, the present invention is not limited to this type communication protocol. It will be clear to those skilled in the art, after reading this disclosure, how to make and use alternative embodiments of the present invention in which another type of network and another type of communication protocol are used (e.g., GSM network, H.323, Skype, etc.). More specifically, it will be clear to those skilled in the art, after reading this disclosure, that alternative embodiments of the present invention can be devised in which the node executing feature interaction detector (FID) 300 is another type of network node, such as, for example and without limitation, PBX switch, GSM base station, Skype server, etc.

Tasks 710 through 780 are described for illustrative purposes. It will be clear to those skilled in the art, after reading this disclosure, how to perform the tasks associated with FIG. 7 in a different order than represented or to perform one or more of the tasks concurrently. Furthermore, it will be clear to those skilled in the art, after reading this disclosure, how to make and use alternative embodiments of the present invention that omit one or more of the tasks.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
  detecting, at a device, a first invocation of a first communication feature;
  detecting, at the device, a second invocation of a second communication feature;
  comparing the first communication feature and the second communication feature according to a predicate-based rule relating to a first pre-condition, a first post-condition, and a first triggering event associated with the first communication feature with a second pre-condition, a second post-condition, and a second triggering event associated with the second communication feature, wherein a pre-condition is a predicate that must be true in order for a feature to be executed, a post-condition is a condition that must be true after execution of the feature, and a triggering event is an event that causes execution of the feature, wherein comparing the first communication feature and the second communication feature further comprises:
    determining whether the first pre-condition negates the second pre-condition, to yield a first determination,
    determining whether the first post-condition negates of the second post-condition, to yield a second determination, and determining whether the first triggering event is equivalent to the second triggering event, to yield a third determination; and based on the first determination, the second determination, the third determination, and the predicate-based rule, identifying an interaction between the first communication feature and the second communication feature.

2. The method of claim 1, wherein the device is a session initiation protocol server.

3. The method of claim 1, further comprising registering the device with the component of the communication application.

4. The method of claim 1, wherein monitoring the state of the component of the communication application comprises receiving an indication of a state change associated with the component of the communication application.

5. The method of claim 1, wherein monitoring the state of the component of the communication application comprises periodically polling the component of the communication application.

6. The method of claim 1, further comprising transmitting an indication to a message component of the communication application based on the interaction.

7. The method of claim 1, wherein the communication protocol signaling is transmitted as part of an ongoing communication session that is taking place between the communication application and another party.

8. The method of claim 1, wherein the first communication feature is a call-related communication feature and the second communication feature is a web-enabled communication feature.

9. The method of claim 1, wherein the first invocation is detected by monitoring communication protocol signaling that is transmitted by a communication application, and the second invocation is detected by monitoring a state of a component of the communication application.

10. A method comprising:
registering, at a communication terminal that is executing browser software, a browser plug-in with a widget of a browser-based application, wherein:
  (i) the widget is operable to provide a call-related communication feature,
  (ii) the browser plug-in is operable to determine whether the call-related communication feature interacts with a web-enabled communication feature, wherein the web-enabled communication feature is not a call-related communication feature, and
  (iii) both the communication application and the browser plug-in are executed by the browser software;
comparing the call-related communication feature and the web-enabled communication feature according to a predicate-based rule relating to a first pre-condition, a first post-condition, and a first triggering event associated with the call-related communication feature with a second pre-condition, a second post-condition, and a second triggering event associated with the web-enabled communication feature, wherein a pre-condition is a predicate that must be true in order for a feature to be executed, a post-condition is a condition that must be true after execution of the feature, and a triggering event is an event that causes execution of the feature, wherein comparing the call-related communication feature and the web-enabled communication feature further comprises:
  determining whether the first pre-condition negates the second pre-condition, to yield a first determination,
  determining whether the first post-condition negates of the second post-condition, to yield a second determination, and
  determining whether the first triggering event is equivalent to the second triggering event, to yield a third determination; and
based on the first determination, the second determination, the third determination, and the predicate-based rule, identifying, via the browser plug-in, an interaction between the call-related communication feature and the web-based communication feature.

11. The method of claim 10, further comprising executing the call-related communication feature only when permission from the browser plug-in is received by the widget.

12. A method comprising:
receiving, at a device, indications of an invocation of a first service associated with a communication application and a second service associated with the communication application;
comparing the first service and the second service according to a predicate-based rule relating to a first pre-condition, a first post-condition, and a first triggering event associated with the first service with a second pre-condition, a second post-condition, and a second triggering event associated with the second service, wherein a pre-condition is a predicate that must be true in order for a service to be provided, a post-condition is a condition that must be true after provision of the service, and a triggering event is an event that causes provision of the service, wherein comparing the first service and the second service further comprises:
  determining whether the first pre-condition negates the second pre-condition, to yield a first determination,
  determining whether the first post-condition negates of the second post-condition, to yield a second determination, and
  determining whether the first triggering event is equivalent to the second triggering event, to yield a third determination;
identifying an interaction between the first service and the second service based on the first determination, the second determination, the third determination, and the predicate-based rule; and
resolving the interaction between the first service and the second service.

13. The method of claim 12, wherein the first service is provided by a first widget associated with the communication application and the second service is provided by a second widget associated with the communication application.

14. The method of claim 12, wherein resolving the interaction comprises instructing the communication application not to execute one of the first service and the second service.

15. The method of claim 12, wherein resolving the interaction comprises sending a notification of the interaction to the device.

16. The method of claim 12, wherein the indications are received via a component of the communication application.

17. The method of claim 16, wherein the component of the communication application comprises a browser plugin.

18. The method of claim 16, wherein one of the indications is received from a widget associated with the communication application.

19. The method of claim 17, further comprising registering the component associated with the communication application with the widget before receiving the indications.

20. The method of claim 17, wherein the interaction is identified via the component associated with the communication application.

\* \* \* \* \*